United States Patent [19]
Jianxing

[11] Patent Number: 6,134,904
[45] Date of Patent: Oct. 24, 2000

[54] LOW NOISE WINDOW-TYPE AIR CONDITIONER

[76] Inventor: Tao Jianxing, 7 Kou Tai Road, Tai Zhou, Jiang Su, China

[21] Appl. No.: 09/169,187

[22] Filed: Oct. 8, 1998

[51] Int. Cl.⁷ .................................................. F25D 19/00
[52] U.S. Cl. .................................. 62/296; 62/262; 62/263
[58] Field of Search .............................. 62/296, 262, 263

[56] References Cited

U.S. PATENT DOCUMENTS

| | | | |
|---|---|---|---|
| 2,391,859 | 1/1946 | Babcock | 62/129 |
| 2,945,359 | 7/1960 | MaCleod | 62/280 |
| 3,112,623 | 12/1963 | Crossman | 62/419 |
| 4,100,764 | 7/1978 | Murano | 62/289 |
| 4,332,114 | 6/1982 | Goebel et al. | 52/36 |
| 4,586,349 | 5/1986 | Ohishi | 62/296 |
| 5,191,770 | 3/1993 | Kim | 62/563 |
| 5,313,806 | 5/1994 | Feng | 62/295 |
| 5,386,702 | 2/1995 | Wiesen | 62/262 |
| 5,943,873 | 8/1999 | Chung | 62/262 |

*Primary Examiner*—Henry Bennett
*Assistant Examiner*—Marc Norman
*Attorney, Agent, or Firm*—Abelman, Frayne & Schwab

[57] ABSTRACT

A low noise window-type air conditioner is disclosed which consists of a shell, a compressor, an outdoor fan, an indoor fan, an evaporator and a condenser. The air conditioner has one motor which drives the outdoor fan and a second motor which drives the indoor fan. Because the outdoor fan and the indoor fan are in separate compartments and are driven separately and individually by each other, the difficulty of motion equilibrium can be overcome easily, and the vibration and noise is decreased extensively.

7 Claims, 1 Drawing Sheet

LOW NOISE WINDOW-TYPE AIR CONDITIONER

BACKGROUND OF THE INVENTION

1. Field of the Invention

The present application relates to a low noise window-type air conditioner.

2. Description of the Related Art

In presently known window-type air conditioners, an indoor centrifugal-type fan and an outdoor axial-type fan are driven by a single motor. However, it has been found that such arrangement can cause intensive vibration and loud noises due to bad motion equilibrium. Furthermore, because the inflowing and outflowing air of the centrifugal-type fan distributes the air asymmetrically, it generally causes loud noises and low diathermal efficiency of the evaporator. The present invention relates to a low noise window-type air conditioner which is structured and arranged to overcome the problems of the prior art air conditioners.

BRIEF SUMMARY OF THE INVENTION

An air conditioner which comprises a shell defining a first indoor portion and a second outdoor portion, said outdoor portion including a compressor, an outdoor fan driven by a first motor, and a condenser, said indoor portion including an evaporator and a fan driven by a second motor. The air conditioner includes a sound absorbing and vibration dampening material clapboard.

The indoor portion is separated from the outdoor portion by a clapboard member. The outdoor fan is a centrifugal-type blade fan, and indoor fan is a long drum-type crosscurrent fan having a rotational axis parallel to a line overlooking a front air conditioner panel.

Preferably the air conditioner comprises a shell defining a first indoor portion and a second outdoor portion separated from the first indoor portion by a clapboard member, the outdoor portion including a compressor, an outdoor fan driven by a first motor, and a condenser, the indoor portion further including a fan driven by a second motor and an evaporator.

In particular the low noise window-type air conditioner consists of a shell, compressor, outdoor fan, indoor fan, evaporator and condenser. It features a separate fan motor and a separate indoor fan motor. Because the outdoor fan and the indoor fan are driven separately and individually by each motor, the difficulty of motion equilibrium can be overcome easily, with the result that the vibration and noise produced by the air conditioner is decreased extensively.

DETAILED DESCRIPTION OF THE INVENTION

Figure 1:
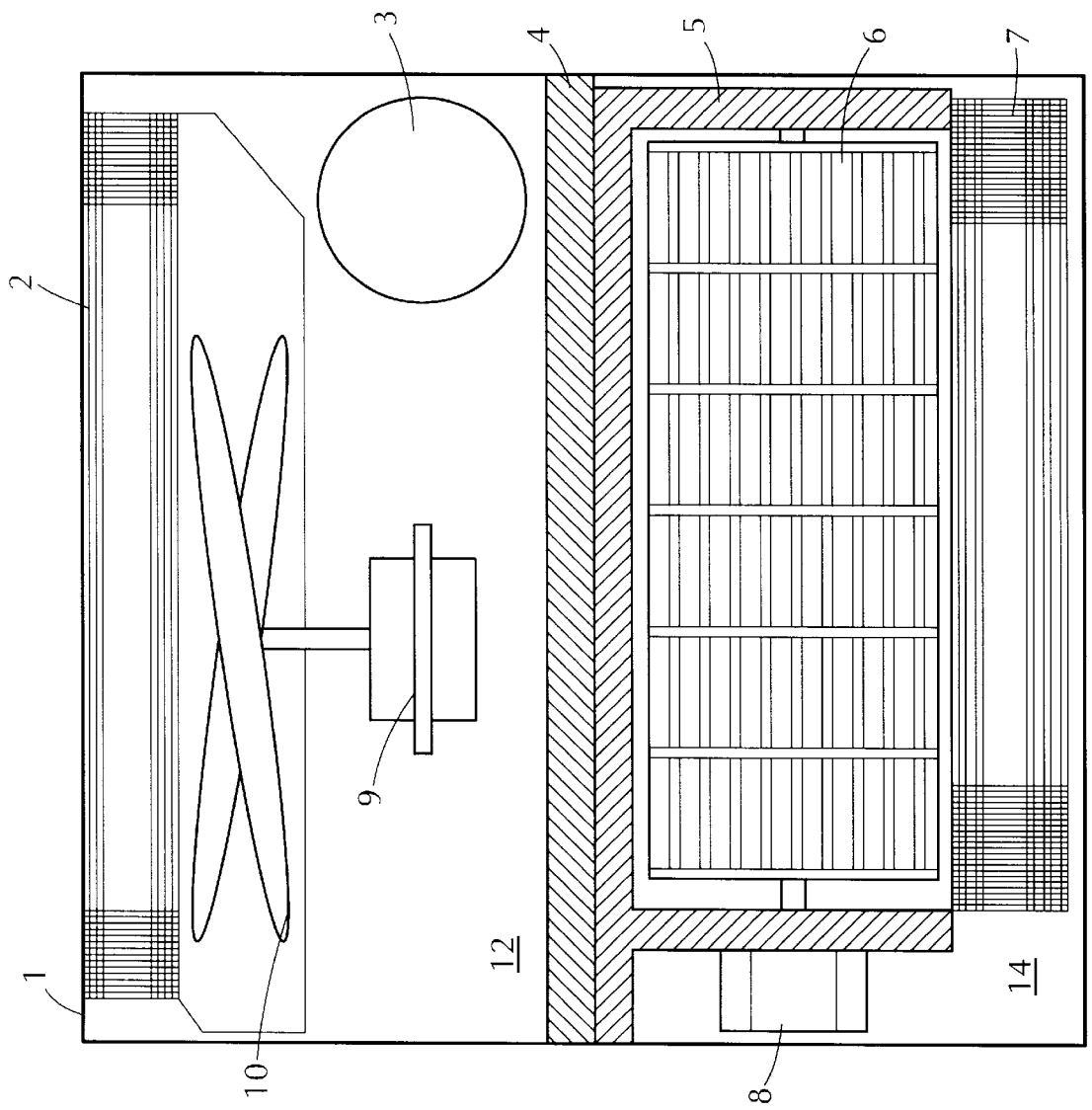
FIG. 1 is a plan view from above, partially in cross-section, of a window-type air conditioner constructed according to the present invention.

Referring to FIG. 1 there is shown a plan view from above of an air conditioner constructed according to the present invention. The air conditioner includes shell 1, compressor 3, outdoor fan 10 and outdoor fan motor 9, condenser 2, indoor fan 6, indoor fan motor 8 and evaporator 7.

In order to reduce the vibrations and noise produced by the air conditioner the following features are provided. Air conditioner shell 1 is divided by clapboard 4 into an indoor part 12 and outdoor part 14. Compressor 3, outdoor fan 10, outdoor fan motor 9 and condenser 2 are provided in the outdoor part 12. Indoor fan 6, indoor fan motor 8 and evaporator 7 are provided in the indoor part 14. The clapboard is made of a vibration damping and sound absorbing material so it can keep a maximum amount of outdoor noise out of the indoor part 14.

Indoor fan 6 is a large diameter long drum-type low noise crosscurrent fan having a low rotational speed. The rotational axis of fan 6 is normally parallel to the overlooking line of the front panel of the window-type air conditioner. Indoor fan 6 can provide an even air flow which produces lower noise and raises the diathermal efficiency of the indoor evaporator 7. Fan 6 also facilitates lower power consumption, a feature which also enhances machine performance. In FIG. 1 the polystyrene ventilation duct 5 is provided for crosscurrent fan 6 as shown. Polystyrene ventilation duct 5 includes steel implants (not shown) as described in commonly assigned, concurrently filed application entitled Window-Type Air Conditioning Low Noise Ventilation Duct, the disclosure of which is incorporated herein by reference and made a part of this disclosure.

Although the invention has been described in detail with reference to the illustrated preferred embodiments, variations and modifications may be provided within the scope and spirit of the invention as described and as defined by the following claims.

What is claimed is:

1. An air conditioner comprising:

a.) a shell (1), defining a first, indoor portion (12), and a second, outdoor portion (14), of said air conditioner, said outdoor portion (14) including a compressor (3), an outdoor fan (10), driven by a first, outdoor fan motor (9), and a condenser (2), said indoor portion (12) including an evaporator (7) and an indoor fan (6), driven by a second, indoor fan motor (8); and b.) a sound absorbing and vibration dampening clapboard separator (4), separating the first, indoor portion (12) and the second, outdoor portion (14) of the shell.

2. The air conditioner according to claim 1, wherein the outdoor fan (10) is a centrifugal blade fan.

3. The air conditioner according to claim 1, wherein the indoor fan (6) is long drum crosscurrent fan.

4. The air conditioner according to claim 3, wherein the indoor fan (6) is a croscurrent fan having a rotational axis parallel to a line overlooking a front air conditioner panel (15).

5. The air conditioner according to claim 1, wherein the first, indoor portion (12) further comprises a ventilation duct (5).

6. The air conditioner according to claim 5, wherein the ventilation duct (5) includes steel implants for supporting indoor fan (6).

7. The air conditioner according to claim 5, wherein the ventilation duct (5) is fabricated from polystyrene.

* * * * *